(12) United States Patent
Moon

(10) Patent No.: US 12,470,792 B2
(45) Date of Patent: Nov. 11, 2025

(54) CAMERA MODULE

(71) Applicant: LG INNOTEK CO., LTD., Seoul (KR)

(72) Inventor: Da Hin Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 143 days.

(21) Appl. No.: 18/568,495

(22) PCT Filed: Jun. 9, 2022

(86) PCT No.: PCT/KR2022/008102
§ 371 (c)(1),
(2) Date: Dec. 8, 2023

(87) PCT Pub. No.: WO2022/260440
PCT Pub. Date: Dec. 15, 2022

(65) Prior Publication Data
US 2024/0284022 A1    Aug. 22, 2024

(30) Foreign Application Priority Data
Jun. 10, 2021 (KR) .......................... 10-2021-0075548

(51) Int. Cl.
*H04N 23/52* (2023.01)
*H04N 23/51* (2023.01)
*H05K 9/00* (2006.01)

(52) U.S. Cl.
CPC .............. *H04N 23/52* (2023.01); *H04N 23/51* (2023.01); *H05K 9/0064* (2013.01)

(58) Field of Classification Search
None
See application file for complete search history.

(56) References Cited

U.S. PATENT DOCUMENTS

| | | | |
|---|---|---|---|
| 6,518,864 B1 | 2/2003 | Ito et al. | |
| 2014/0132768 A1 | 5/2014 | Choi et al. | |
| 2015/0015778 A1 | 1/2015 | Lee | |
| 2015/0029337 A1* | 1/2015 | Uchiyama | H01R 4/06 348/148 |
| 2019/0028620 A1* | 1/2019 | Park | H04N 23/55 |
| 2019/0373142 A1* | 12/2019 | Fujiwara | H04N 23/54 |

(Continued)

FOREIGN PATENT DOCUMENTS

| | | | | |
|---|---|---|---|---|
| CN | 202522828 U | * | 11/2012 | ............. H04N 23/52 |
| EP | 2136552 A1 | * | 12/2009 | ............. H04N 23/57 |

(Continued)

OTHER PUBLICATIONS

International Search Report dated Sep. 16, 2022 in International Application No. PCT/KR2022/008102.

(Continued)

*Primary Examiner* — Rodney E Fuller
(74) *Attorney, Agent, or Firm* — SALIWANCHIK, LLOYD & EISENSCHENK

(57) ABSTRACT

A camera module comprises: a first body including a lens; a second body coupled to the first body; and a printed circuit board arranged in the first body, wherein the first body includes a first ground portion protruding downward, and the second body includes a second ground portion protruding upward to contact the first ground portion.

20 Claims, 6 Drawing Sheets

(56) References Cited

U.S. PATENT DOCUMENTS

2020/0053258 A1     2/2020   Park et al.
2020/0292918 A1     9/2020   Park

FOREIGN PATENT DOCUMENTS

| | | |
|---|---|---|
| EP | 3 346 692 A1 | 7/2018 |
| JP | 2018-98660 A | 6/2018 |
| JP | 2018-164190 A | 10/2018 |
| KR | 10-2012-0005705 A | 1/2012 |
| KR | 10-2017-0084550 A | 7/2017 |
| KR | 10-2018-0010422 A | 1/2018 |
| KR | 10-2019-0004457 A | 1/2019 |
| KR | 10-2021-0057414 A | 5/2021 |

OTHER PUBLICATIONS

Supplementary European Search Report dated Apr. 28, 2025 in European Application No. 22820567.0.

\* cited by examiner

CAMERA MODULE

CROSS-REFERENCE TO RELATED APPLICATIONS

This application is the U.S. national stage application of International Patent Application No. PCT/KR2022/008102, filed Jun. 9, 2022, which claims the benefit under 35 U.S.C. § 119 of Korean Application No. 10-2021-0075548, filed Jun. 10, 2021, the disclosures of each of which are incorporated herein by reference in their entirety.

TECHNICAL FIELD

The teachings in accordance with exemplary and non-limiting embodiments of this invention relate generally to a camera module.

BACKGROUND ART

In recent years, miniaturized camera modules have been developed, and miniaturized camera modules are widely used in small electronic products such as smartphones, laptops, game consoles, etc.

With the popularization of automobiles, miniaturized cameras are not only used in small electronic products, but also in vehicles. For example, miniaturized cameras may be used as black box cameras for vehicle protection or objective data of traffic accidents, rearview cameras that allow the driver to monitor the blind spots at the rear of the vehicle through the screen to ensure safety when reversing, and peripheral sensing cameras that can monitor the surroundings of the vehicle.

The camera may include a lens, a lens holder for receiving the lens, an image sensor for converting an image of a subject gathered by the lens into an electrical signal, and a printed circuit board on which the image sensor is mounted. A housing forming the exterior of the camera may have an entirely enclosed structure to inhibit contamination of the internal components with foreign matter, including moisture.

DETAILED DESCRIPTION OF INVENTION

Technical Subject

The present exemplary embodiment is to provide a camera module in which the electrical characteristics of the camera module can be further improved by improving the structure, and a bonded state between a plurality of bodies can be maintained firmly.

Furthermore, the present exemplary embodiment is to provide a camera module capable of protecting electronic devices mounted on a PCB by forming a grounding structure on the housing to connect with a grounding end of the PCB to eliminate electromagnetic waves entering from the outside.

Technical Solution

In one general aspect of the present invention, there may be provided a camera module comprising:
a first body including a lens;
a second body coupled to the first body; and
a printed circuit board arranged in the first body, wherein the first body may include a first ground portion protruding downward, and the second body may include a second ground portion protruding upward to contact the first ground portion.

Preferably, but not necessarily, the first body may include a top plate and a first side plate extending downwardly from the top plate, the first ground portion may project downwardly from a bottom surface of the top plate, and the second body may include a bottom plate and a second side plate extending upwardly from the bottom plate, and the second ground portion may project upwardly from a top surface of the bottom plate.

Preferably, but not necessarily, a first edge region may be disposed on a bottom surface of the first body and a second edge region may be disposed on a top surface of the second body, and when the first ground portion and the second ground portion are in contact, the first edge region and the second edge region may be at least partially spaced apart in an optical axis direction.

Preferably, but not necessarily, an adhesive member may be disposed between the first edge region and the second edge region.

Preferably, but not necessarily, the adhesive member may include an epoxy.

Preferably, but not necessarily, the first edge region includes a first protrusion, and a first groove disposed inwardly of the first protrusion, and a second edge region may include a second groove into which the first protrusion is engaged, and a second protrusion engaged in the first groove, wherein a bottom end of the first protrusion may be disposed lower than a top end of the second protrusion.

Preferably, but not necessarily, a bottom end of the first ground portion may be disposed lower than a bottom end of the first protrusion, and a top end of the second ground portion may be disposed lower than a bottom surface of the second groove.

Preferably, but not necessarily, the first ground portion may include a first-1 ground portion disposed at a corner of the first body and a first-2 ground portion disposed at a side of the first body, and the second ground portion may include a second-1 ground portion disposed at a corner of the second body and in contact with the first ground portion, and a second-2 ground portion disposed at a side of the second body and in contact with the first-1 ground portion.

Preferably, but not necessarily, the printed circuit board may include a circuit region, and a ground region disposed along an edge of the circuit region, and the ground region may include a guide groove through which the first ground portion penetrates.

In another general aspect of the present invention, there may be provided a camera module, comprising:
a first body including a lens, and including a first edge region on a bottom surface;
a second body coupled to the first body, and including a second edge region on a top surface facing the first edge region; and
a printed circuit board disposed within the first body, the first body including a first ground portion projecting downwardly, and the second body including a second ground portion projecting upwardly and in contact with the first ground portion, wherein,
upon contact of the first ground portion with the second ground portion, the first edge region and the second edge region may be spaced apart.

Advantageous Effect

Since the first body, the second body, and the printed circuit board are electrically connected to form a ground region through the exemplary embodiment, electromagnetic waves generated in the circuit region of the printed circuit board can be inhibited from radiating outwardly and affecting adjacent electronic components or from entering the printed circuit board, thereby further improving the electrical characteristics of the camera module and inhibiting the inclusion of noise in the electrical signals, resulting in superior quality images.

Furthermore, the contact of the first ground portion and the second ground portion forms a region between the first body and the second body in which an adhesive member is disposed, which has the advantage of facilitating the manufacturing process of the camera module.

BEST MODE

Hereinafter, exemplary embodiments of the present invention will be described in detail with reference to the accompanying drawings.

However, the present invention is not limited to the specific embodiments described, but may be implemented in a variety of different forms, and one or more of its components may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, "optical axis direction" is defined as the optical axis direction of the lens. On the other hand, "optical axis direction" may correspond to "up and down direction", "z-axis direction", etc.

Hereinafter, the present invention will be described in more detail with reference to the accompanying drawings.

Figure 1:
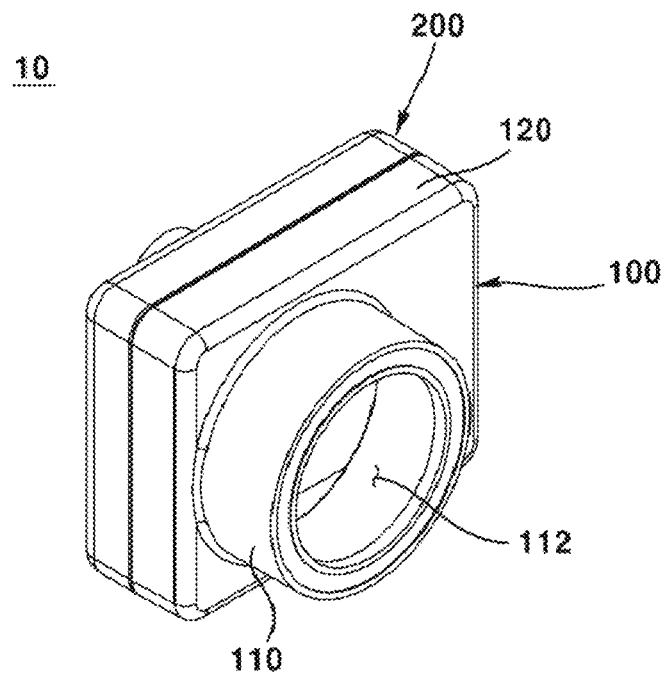
FIG. 1 is a perspective view illustrating an exterior view of a camera module according to an exemplary embodiment of the present invention.
Figure 2:
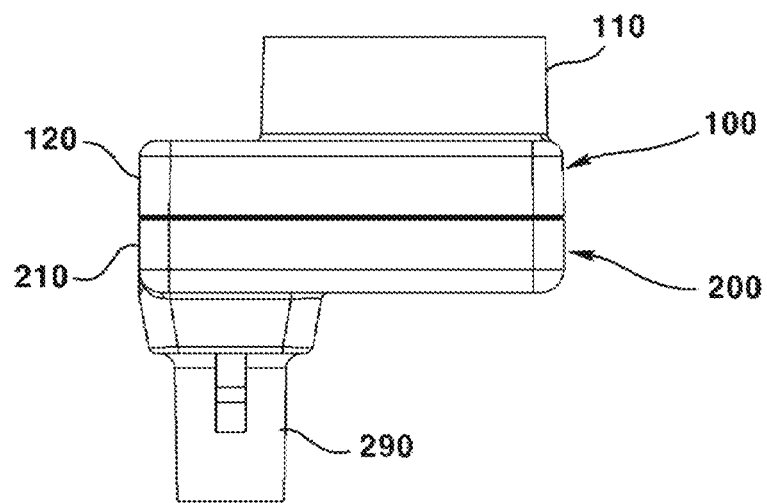
FIG. 2 is a plan view illustrating a side surface of a camera module according to an exemplary embodiment of the present invention.
Figure 3:
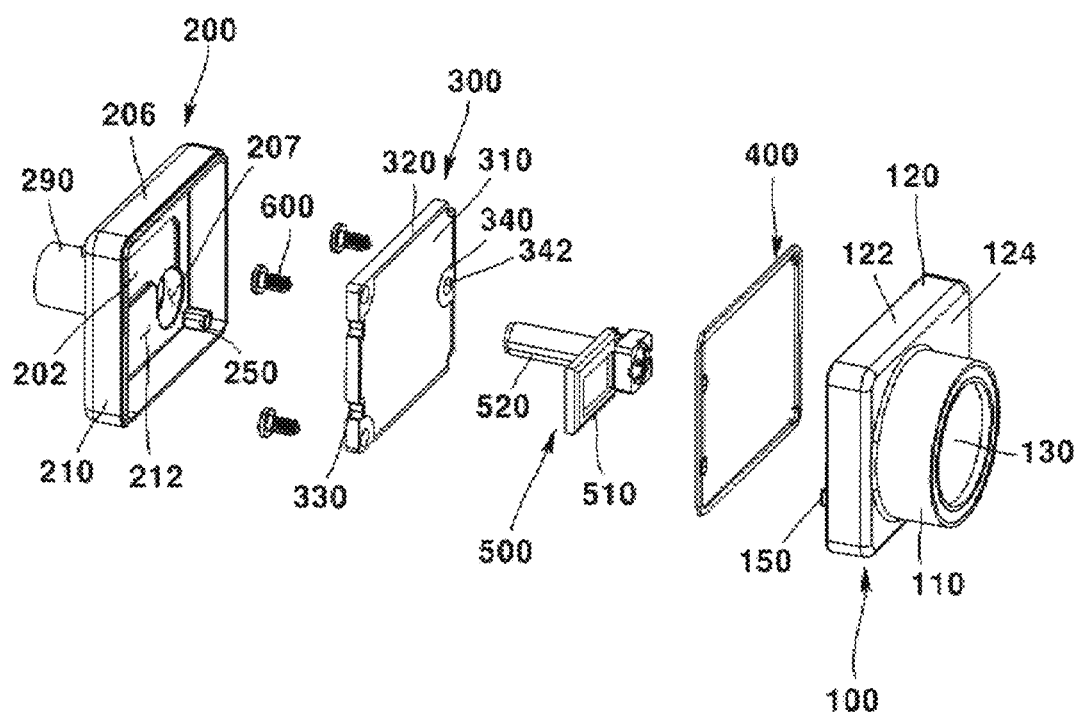
FIG. 3 is an exploded perspective view of a camera module according to an exemplary embodiment of the present invention.
Figure 4:
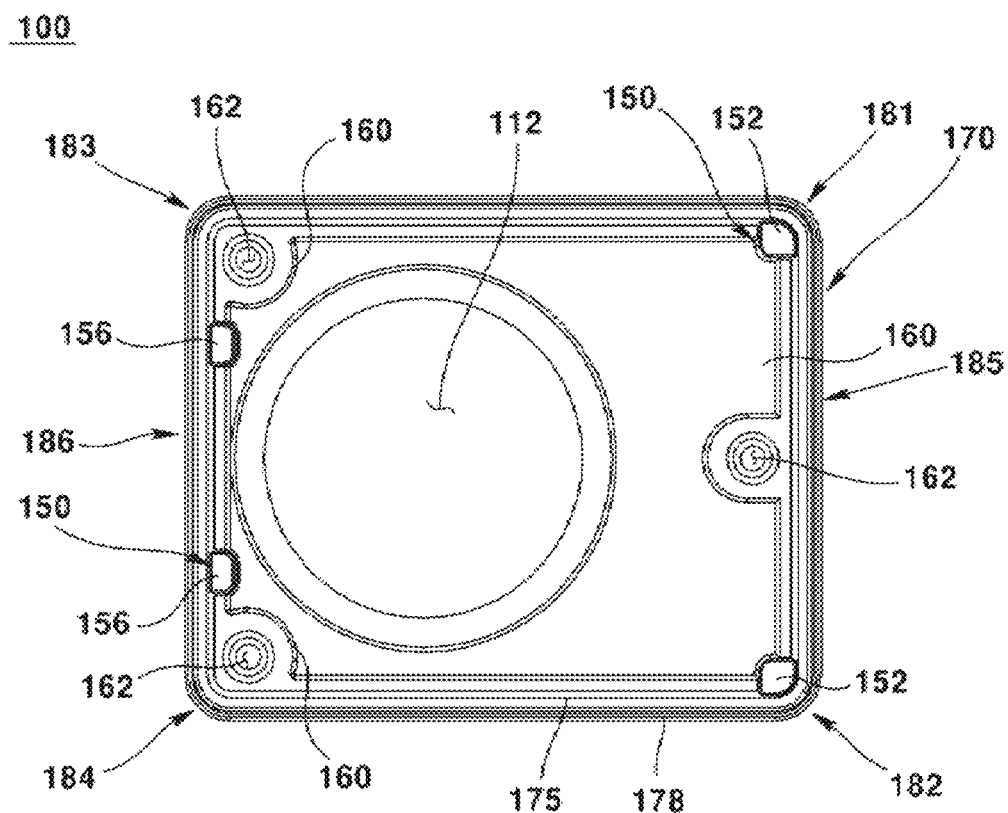
FIG. 4 is a plan view illustrating a bottom surface of a first body according to an exemplary embodiment of the present invention.
Figure 5:
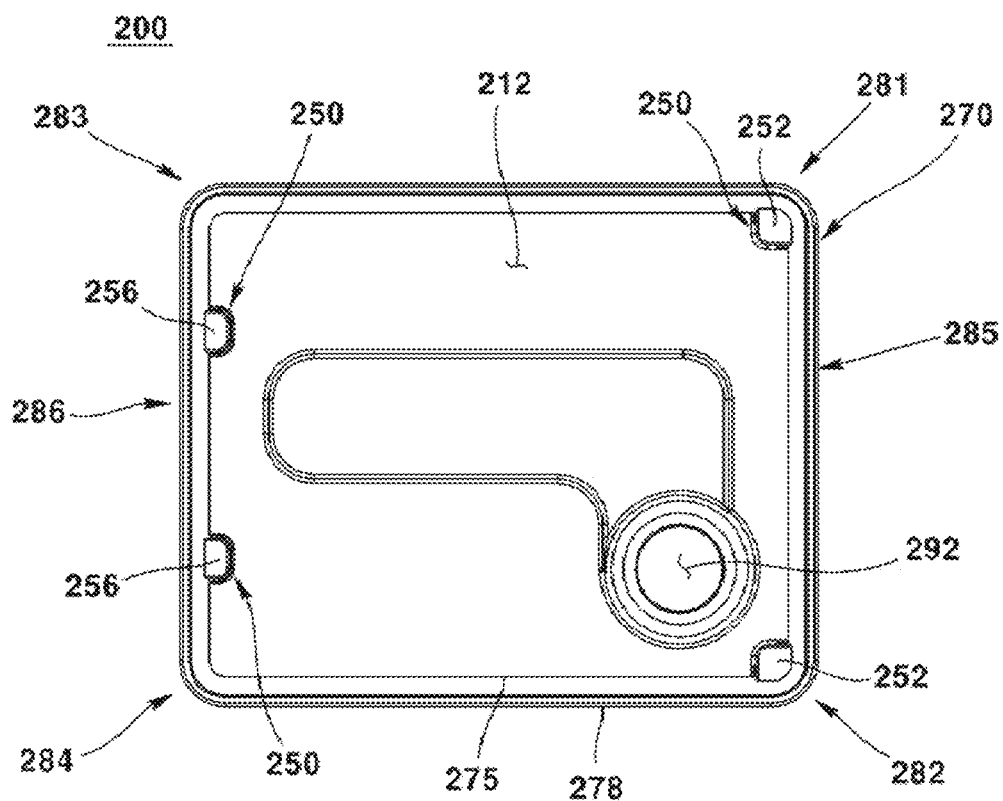
FIG. 5 is a plan view illustrating a top surface of a second body according to an exemplary embodiment of the present invention.
Figure 6:
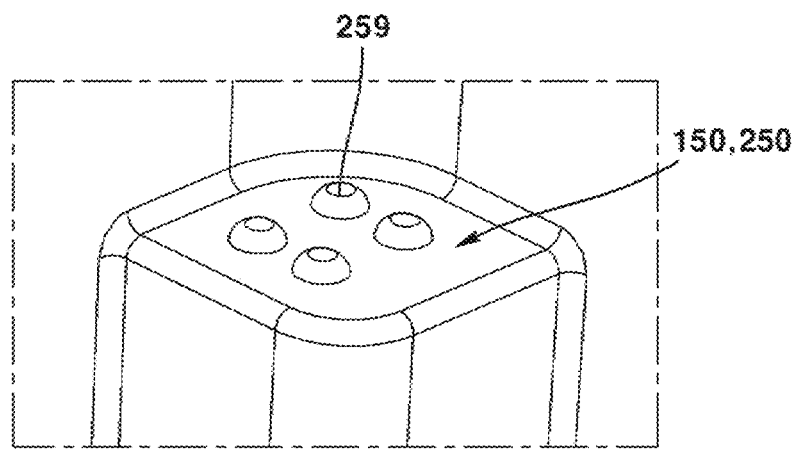
FIG. 6 is an enlarged view of a ground portion according to an exemplary embodiment of the present invention.
Figure 7:
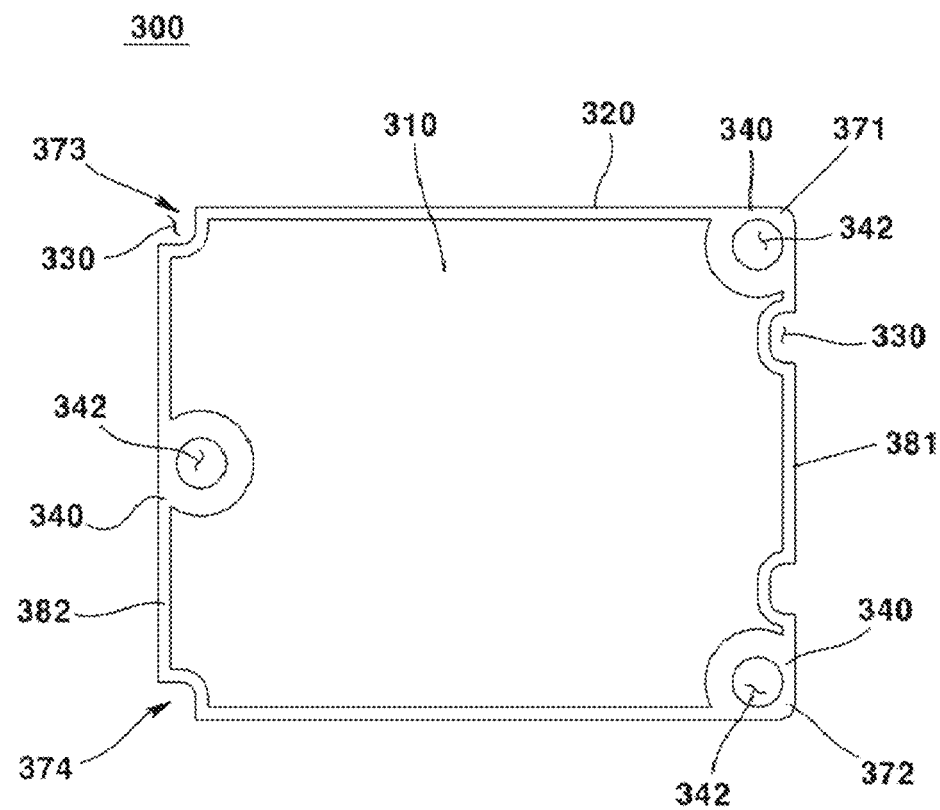
FIG. 7 is a plan view of a printed circuit board according to an exemplary embodiment of the present invention.
Figure 8:
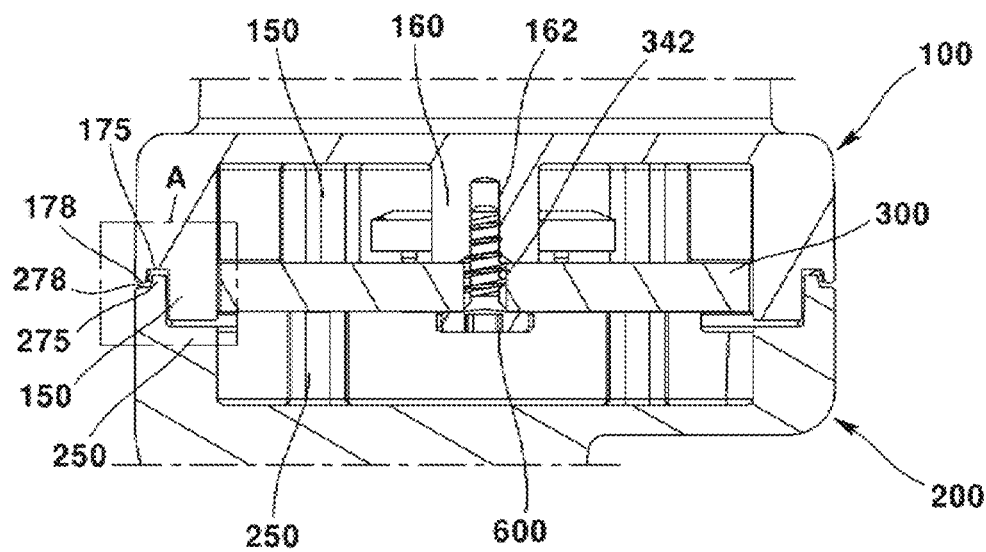
FIG. 8 is a cross-sectional view illustrating the internal structure of a camera module according to an exemplary embodiment of the present invention.
Figure 9:
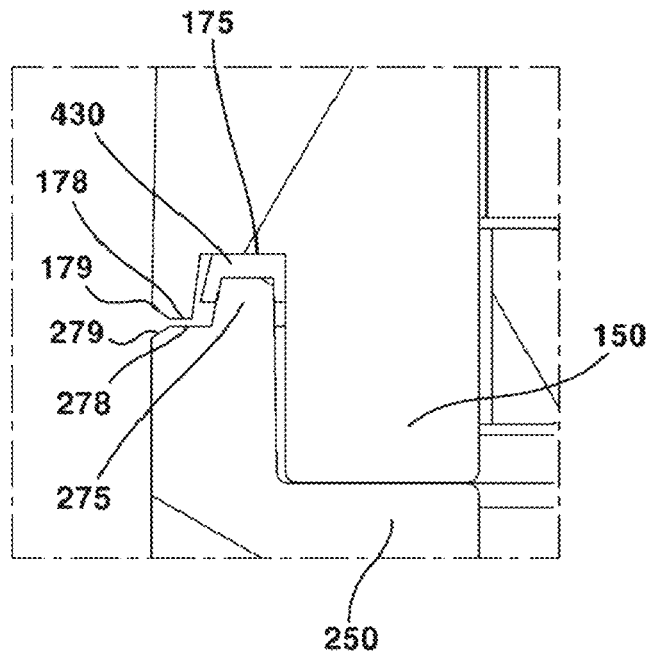
FIG. 9 is an enlarged view of A of FIG. 8.

FIG. 1 is a perspective view illustrating an exterior view of a camera module according to an exemplary embodiment of the present invention, FIG. 2 is a plan view illustrating a side surface of a camera module according to an exemplary embodiment of the present invention, FIG. 3 is an exploded perspective view of a camera module according to an exemplary embodiment of the present invention, FIG. 4 is a plan view illustrating a bottom surface of a first body according to an exemplary embodiment of the present invention, FIG. 5 is a plan view illustrating a top surface of a second body according to an exemplary embodiment of the present invention, FIG. 6 is an enlarged view of a ground portion according to an exemplary embodiment of the present invention, FIG. 7 is a plan view of a printed circuit board according to an exemplary embodiment of the present invention, FIG. 8 is a cross-sectional view illustrating the internal structure of a camera module according to an exemplary embodiment of the present invention and FIG. 9 is an enlarged view of A of FIG. 8.

Referring to FIGS. 1 through 9, a camera module (10) according to an exemplary embodiment of the present invention may be a vehicle camera module. The camera module (10) may be coupled to a vehicle. The camera module (10) may be used in one or more of a front camera, a side camera, a rear camera, and a black box of the vehicle. The camera module (10) may be disposed at the front of the vehicle. The camera module (10) may be disposed at the rear of the vehicle. The camera module (10) may be coupled to a windshield of the vehicle. The camera module (10) may be coupled to the windshield of the front or rear of the vehicle. The camera module (10) may be disposed on the side of a vehicle. The camera module (10) may photograph a subject and output an image to a display (not shown).

The camera module (10) may include a first body (100). The first body (100) may be referred to as any one of a front body, an upper housing, or a first housing. The first body (100) may include a body portion (120). The first body (100)

may include a barrel portion (110). The first body (100) may include a lens (130). The body portion (120), barrel portion (110), and lens (130) of the first body (100) may be integrally formed. Any two or more of the body portion (120), barrel portion (110), and lens (130) of the first body (100) may be integrally formed. In a modification, the body portion (120), the barrel portion (110), and the lens (130) may each be formed separately.

The body portion (120) may be coupled to the barrel portion (110). The body portion (120) may be integrally formed with the barrel portion (110). The body portion (120) may be formed of a metal material. The body portion (120) may be disposed over the second body (200), which will be described later. The body portion (120) may be coupled to the second body (200). A bottom end of the body portion (120) may be secured to the second body (200). The body portion (120) may be coupled to the second body (200) by an adhesive. The body portion (120) may be coupled to a printed circuit board (300), which will be described later.

The body portion (120) may be formed as a rectangular shape with an open bottom. In this case, the corners of the body portion (120) may be rounded. The body portion (120) may include a top plate (124) and a first side plate (122) extending from the top plate (124). The top plate (124) may be formed in a rectangular shape. The top plate (124) may extend outwardly from a lower outer peripheral surface of the barrel portion (110). A first side plate (122) may extend downwardly from an outer edge of the top plate (124). The first side plate (122) may comprise a plurality of plates. The first side plate (122) may include four side plates. The first side plate (122) may be formed in the shape of a square plate. The first side plate (122) may include a first-1 side plate and a first-2 side plate, a first-3 side plate disposed on opposite sides of the first-1 side plate, and a first-4 side plate disposed on opposite sides of the first-2 side plate. The first side plate (122) may include first-1 to first-4 corners each disposed between the first-1 to first-4 side plates. Each of the first-1 to first-4 corners may include a rounded shape in at least a portion.

On an inner side of the body portion (120), a space portion may be formed that is compartmentalized from other regions. The space portion may be open at a bottom, and a top may be covered by the barrel portion (110) and a bottom surface of lens (130).

The body portion (120) may include a first edge region (170). The first edge region (170) may be disposed on an outer side of the space portion. The first edge region (170) may form a bottom edge of the body portion (120). The first edge region (170) may include a first protrusion (178) and a first groove (175). Relative to the center of the body portion (120), the first groove (175) may be disposed on an inner side of the first protrusion (178).

The first protrusion (178) may be disposed on an outer side of the first groove (175). The first protrusion (178) may be formed to project downwardly from a bottom surface of the body portion (120). Relative to the optical axis direction, a lower end of the first protrusion (178) may be disposed above a bottom surface of a printed circuit board (300). In the optical axis direction, a lower end of the first protrusion (178) may be disposed lower than a top surface of the printed circuit board (300). The lower end of the first protrusion (178) may be disposed lower than the bottom surface of the first groove (175). The bottom surface of the first groove (175) may be disposed between a top surface and a bottom surface of the printed circuit board (300).

A first slope (179) may be formed on the lower edge of the first protrusion (178), which may be shaped to have an inwardly decreasing optical axis length to the second body (200). A first groove (175) may be disposed on an inner side of the first protrusion (178). The first groove (175) may be formed to be recessed upwardly from the bottom of the first protrusion (178). A bottom surface of the first groove (175) may be disposed above the bottom of the first protrusion (178).

The first body (100) may include a barrel portion (110). The barrel portion (110) may be a lens barrel. The barrel portion (110) may be formed of a metal material. The barrel portion (110) may be disposed on the body portion (120). The barrel portion (110) may extend from a top surface of the body portion (120). The barrel portion (110) may be integrally formed with the body portion (120). In a modification, the barrel portion (110) may be coupled to the body portion (120). In this case, the barrel portion (110) may be secured to the body portion (120) by an adhesive. The barrel portion (110) may accommodate a lens (130) therein. The barrel portion (110) may include a hole (112). The lens (130) may be disposed in the hole (112) of the barrel portion (110). The inner circumferential surface of the hole in the barrel portion (110) may be formed in a shape and size that corresponds to those of the outer circumferential shape of the lens (130).

The first body (100) may include a lens (130). The lens (130) may be disposed in the barrel portion (110). The lens (130) may be coupled to the barrel portion (110). The lens (130) may be disposed in a hole (112) of the barrel portion (110). The lens (130) may include a plurality of lenses (130). The lens (130) may be aligned with an image sensor, as described later. The lens (130) may be optically aligned with the image sensor. The optical axis of the lens (130) may coincide with the optical axis of the image sensor. The first body (100) may include an infrared ray filter (IR filter) interposed between the lens (130) and the image sensor.

The camera module (10) may include a second body (200). The second body (200) may be referred to as one of a rear body, a lower housing, or a second housing. The second body (200) may be formed in a rectangular shape with an open top. The second body (200) may be formed of a metal material. The second body (200) may be disposed below the first body (100). The second body (200) may be coupled to the first body (100). The second body (200) may be coupled with the first body (100) to form an interior space. The second body (200) may include a space portion (212) having a top surface opening.

The second body (200) may include a bottom plate (202). The bottom plate (202) may oppose a top plate (124) of the body portion (120) of the first body (100). The bottom plate (202) may be spaced apart from the top plate (124) of the body portion (120) of the first body (110) in an optical axis direction. The bottom plate (202) may be parallel to the top plate (124) of the body portion (110) of the first body (100). The bottom plate (202) may be formed in a rectangular shape. In this case, the corners of the bottom plate (202) may include a rounded shape in at least some portions.

The second body (200) may include a second side plate (206). The second side plate (206) may extend from the bottom plate (202). The second side plate (206) may extend from an outer edge of the bottom plate (202). A shield can (not shown) may be disposed on the second side plate (206). An inner surface of the second side plate (206) may be contacted by the shield can. The top of the second side plate (206) may be coupled to the first body (100). An outer surface of the second side plate (206) may be disposed in the same plane as an outer surface of the side plate (122) of the first body (100).

The second body (200) may include a connector ejection portion (290). The connector ejection portion (290) may be coupled to the bottom plate (202). The connector ejection portion (290) may be disposed in a hole (207) of the bottom plate (202). The connector ejection portion (290) may penetrate the hole (207) in the bottom plate (202). The connector ejection portion (290) may have a connector (500) disposed therein. The connector ejection portion (290) may be formed of a metal material.

The second body (200) may include a second edge region (270). The second edge region (270) may be disposed on an outer side of the space portion (212). The second edge region (270) may be formed on a top surface of the second side plate (206). The second edge region (270) may form a top edge of the second body (200). The second edge region (270) may be disposed to face the first edge region (170) in an optical axis direction.

When the first body (100) and the second body (200) are joined, the first edge region (170) and the second edge region (270) may be disposed at least partially spaced apart in the optical axis direction. When the first body (100) and the second body (200) are joined, an adhesive member receptacle (430) may be disposed between the first edge region (170) and the second edge region (270) in which an adhesive member (400), to be described later, is received.

The second edge region (270) may include a second protrusion (275) and a second groove (278). The second groove (278) may be disposed on an outer side of the second protrusion (275). With respect to the optical axis direction, the first protrusion (178) and the second groove (278) may be disposed opposite each other, and the first groove (175) may be disposed opposite the second protrusion (275).

The second protrusion (275) may be formed to project upwardly from a top surface of the second body (200). The second protrusion (275) may be formed to project upwardly from a top surface of the second side plate (206). The second protrusion (275) may be disposed at least partially on the inner side of the first groove (175). With respect to a direction perpendicular to the optical axis direction, the second protrusion (275) may be disposed to at least partially overlap the first protrusion (178). A top of the second protrusion (275) may be disposed above a bottom surface of the second groove (278). The top of the second protrusion (275) or the bottom of the second groove (278) may be disposed between a top surface and a bottom surface of the printed circuit board (300).

Figure 10:
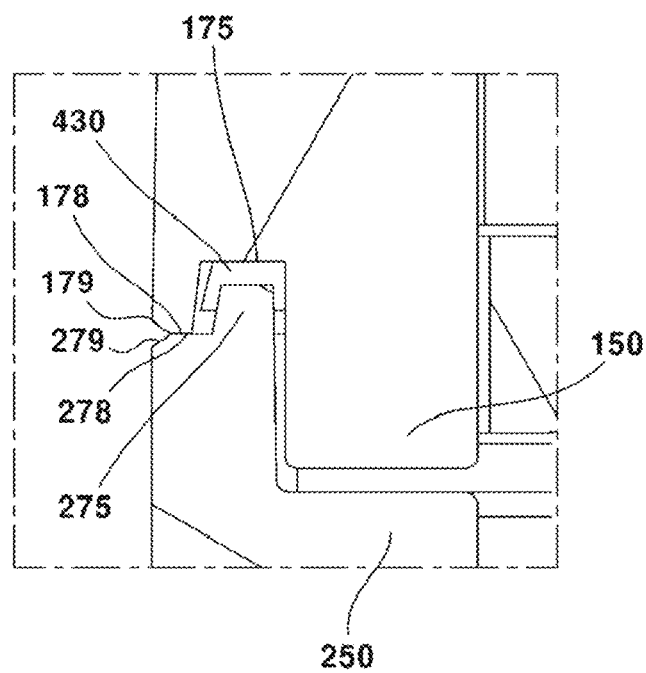
FIG. 10 is a modification of the internal structure of a camera module according to an exemplary embodiment of the present invention.

The second groove (278) may be disposed on an outer side of the second protrusion (275). A bottom surface of the second groove (278) may be disposed lower than a top surface of the second protrusion (275). The second groove (278) may be coupled to the first protrusion (178). The bottom surface of the second groove (278) may be spaced apart in an optical axis direction from the bottom surface of the first protrusion (178) (see FIG. 9), but alternatively, the bottom surface of the second groove (278) may be in contact with the bottom surface of the first protrusion (178) (see FIG. 10).

A bottom surface of the second groove (278) may be disposed with a second slope (279) facing the first slope (179) in an optical axial direction. The second slope (279) may be formed in such a way that its optical axis length to the first body (100) becomes shorter as it moves inward. The camera module (10) may include a printed circuit board (300). The printed circuit board (300) may be disposed within the first body (100). The printed circuit board (300) may be disposed in a space portion within the first body (100). The printed circuit board (300) may be disposed to overlap the first ground portion (150), which will be described later, in a direction perpendicular to the optical axis direction. The printed circuit board (300) may be disposed to overlap the first edge region (170) or the second edge region (270) in a direction perpendicular to the optical axis direction.

An image sensor (not shown) may be disposed on a top surface of the printed circuit board (300). A connector (500) may be coupled to a bottom surface of the printed circuit board (300). The printed circuit board (300) may be electrically connected to the connector (500). The printed circuit board (300) may include a circuit region (310) with a circuit pattern formed thereon, and a ground region (320). The circuit region (310) may be formed with a circuit pattern and may have at least one electronic component mounted on its surface. An image sensor may be disposed in the circuit region (310).

The ground region (320) may be disposed along an edge of the printed circuit board (300). The ground region (320) may be a ground region where the copper foil of the printed circuit board (300) is exposed. The ground region (320) may be in contact with the first body (100) or the second body (200). Accordingly, the first body (100), the second body (200), and the ground region (320) may be interconnected.

The printed circuit board (300) may include a first coupling portion (340). The first coupling portion (340) may include a threaded hole (342) through which a screw (600) is threaded. The threaded hole (342) may be formed to penetrate a bottom surface of the printed circuit board (300).

The first coupling portion (340) may be disposed in the ground region (320). The printed circuit board (300) may be screwedly coupled to the first body (100) via a screw (600) passing through the screw hole (342). Accordingly, the ground region (320) of the printed circuit board (300) and the first body (100) may be electrically connected to each other. The first coupling portion (340) may be provided in a plurality and spaced apart from each other. In one example, the first coupling portion (340) including the screw hole (342) may be disposed at a first corner region (371) and a second corner region (372) of the printed circuit board (300) that are mutually adjacent to each other, and one may be disposed at a second side (382) opposite a first side (381) connecting the first corner region (371) and the second corner region (372).

The printed circuit board (300) may include a guide groove (330). The guide groove (330) may be disposed on the sides of the printed circuit board (300). The guide groove (330) may be disposed in a ground region (320). The guide groove (330) may be shaped such that some of the sides of the printed circuit board (300) are recessed inwardly. The first ground portion (150) may be disposed to penetrate the guide groove (330). This allows the position of the printed circuit board (300) to be guided through the first contact portion (150) and the guide groove (330) when coupling the first body (100) and the printed circuit board (300).

The guide groove (330) may be provided in a plurality and spaced apart from each other. In one example, the guide groove (330) may be disposed in mutually neighboring third corner region (373) and fourth corner region (374) of the printed circuit board (300), and two mutually spaced apart on the first side surface (381). The camera module (10) may include an adhesive member (400). The adhesive member (400) may be a region where an adhesive is cured. More specifically, the adhesive member (400) may be a region where an epoxy has cured. The adhesive member (400) may securely hold the first body (100) and the second body (200) in a coupled state.

The adhesive member (400) may be disposed between the first body (100) and the second body (200). The adhesive member (400) may be disposed between the first edge region (170) and the second edge region (270). As described above, between the first edge region (170) and the second edge region (270) is disposed an adhesive member receptacle (430) that is at least partially an optically spaced apart space, and the adhesive member (400) may be disposed in the adhesive member receptacle (430). Thus, the adhesive member (400) may be disposed between the bottom surface of the first protrusion (178) and the bottom surface of the second groove (278), and between the top surface of the second protrusion (275) and the bottom surface of the first groove (175), to rigidly couple the first body (100) and the second body (200).

On the other hand, when an adhesive such as epoxy is injected into the adhesive member receptacle (430), it is advantageous that a wide injection area is formed by the first slope (179) and the second slope (279), so that an injection process can be easily formed. Alternatively, the first body (100) and the second body (200) may be joined while injecting epoxy into the first groove (175) or the second groove (278).

Hereinafter, a ground structure of the camera module (10) will be described.

The first body (100) may include a first ground portion (150). The first ground portion (150) may be formed to project downwardly from a bottom surface of the top plate (124). The first ground portion (150) may be formed to project inwardly from an inner surface of the first side plate (122). A bottom end of the first ground portion (150) may be disposed within the second body (200). Based on the optical axis direction, the bottom end of the first ground portion (150) may be disposed lower than the bottom end of the first edge region (170). Specifically, the bottom end of the first ground portion (150) may be disposed lower than the bottom end of the first protrusion (178), but alternatively, the bottom end of the first ground portion (150) and the bottom end of the first protrusion (178) may be disposed to form a same height. The first ground portion (150) may be integrally formed with the first body (100). The first ground portion (150) may be formed of a metal material.

The first ground portion 150 may include a first-1 ground portion 152 disposed at a corner region of the first body portion 120 within the first body 100, and a first-2 ground portion 156 disposed at a side of the first body portion 120. The plurality of first-1 ground portions 152 may be disposed in a first corner region 181 and a second corner region 182, respectively, of the first body 100. When a side of the first body 100 connecting the first corner region 181 and the second corner region 182 is referred to as a first side 185, a plurality of first-2 ground portions 156 may be provided on a second side 186 opposite the first side 185 and spaced apart from each other.

The inner surface of the first ground portion (150) may be disposed to protrude inwardly from the inner surface of the first body portion (120). The first ground portion (150) may penetrate the guide groove (330) of the printed circuit board (300) and contact a second ground portion (250), which will be described later. The first body (100) may include a second coupling portion (160). The second coupling portion (160) may be formed to project downwardly from a bottom surface of the top plate (122). A lower end of the second coupling portion (160) may be disposed above a lower end of the first coupling portion (150). The second coupling portion (160) may include a first threaded hole (162) as a region where the printed circuit board (300) is screwed together. The first threaded hole (162) may be disposed to face a threaded hole (342) of the printed circuit board (300) in an optical axis direction. Thus, when the screw (600) penetrates a threaded hole (342) of the printed circuit board (300) and screws into the first threaded hole (162), the printed circuit board (300) may be coupled to the first body (100).

The second coupling portion (160) may be provided in a plurality and spaced apart from each other. The plurality of second coupling portions (160) may be disposed, one on the inner side of the first side surface (185), and one on each of the third corner region (183) and fourth corner region (184) of the first body (100). The number and location of the second coupling portions (160) may correspond to the number and location of the first coupling portions (340) of the printed circuit board (300).

The second body (200) may include a second ground portion (250). The second ground portion (250) may be formed to project upwardly from a top surface of the bottom plate (202). The second ground portion (250) may be formed to project inwardly from an inner surface of the second side plate (206). The top end of the second ground portion (250) may be disposed in a space within the second body (200). Based on the optical axis direction, the top end of the second ground portion (250) may be disposed lower than the top of the second edge region (270).

Specifically, the top end of the second ground portion (250) may be disposed lower than the bottom surface of the second groove (278), but alternatively, the top end of the second ground portion (250) and the bottom surface of the second groove (278) may be disposed to form a same height. The second ground portion (250) may be integrally formed with the second body (200). The second ground portion (250) may be formed of a metal material.

The second ground portion (250) may be formed in a plurality and may be spaced apart from each other. In one example, the second ground portion (250) may include a second-1 ground portion (252) disposed at a corner region within the second body (200) and a second-2 ground portion (256) disposed on an inner surface of the second side plate (206). The plurality of second-1 ground portions (252) may be disposed in a first corner region (281) and a second corner region (282), respectively, within the second body (200). When a side of the second body (200) connecting the first corner region (281) and the second corner region (282) is referred to as a first side (285), a plurality of second-2 ground portion (256) may be provided on an inner surface of the second side (286) opposite the first side (285) and spaced apart from each other. The second-1 ground portion (252) may be disposed to face the first-1 ground portion (152) in an optical axis direction. A top surface of the second-1 ground (252) may contact a bottom surface of the first-1 ground portion (152).

The second-2 ground portion (256) may be disposed to face the first-2 ground portion (252) in an optical axis direction. A top surface of the second-2 ground portion (256) may contact a bottom surface of the first-2 ground portion (252).

To facilitate grounding of the first ground portion (150) and the second ground portion (250), an embossing portion (259) may be disposed on a bottom surface of the first ground portion (150) or a top surface of the second ground portion (250), as shown in FIG. 6. The embossing portion (259) may be formed in a hemispherical shape. The embossing portion (259) may be plurally provided and spaced apart from each other.

When the first ground portion (150) and the second ground portion (250) are spaced apart, the first edge region (170) and the second edge region (270) may contact each other. In this case, at least one of the locations between the bottom surface of the first protrusion (170) and the bottom surface of the second groove (277) or between the top surface of the second protrusion (275) and the bottom surface of the second groove (175) may be in contact with each other, or both may be in contact.

On the other hand, when the first ground portion (150) and the second ground portion (250) are contacted, the first edge region (170) and the second edge region (270) may be spaced apart in the optical axis direction, i.e., between the bottom surface of the first protrusion (178) and the bottom surface of the second groove (278), and between the top surface of the second protrusion (275) and the bottom surface of the second groove (175), respectively. Accordingly, an adhesive member receptacle (430) may be formed in which an adhesive member (400) is disposed between the first edge region (170) and the second edge region (270).

Whereby, a ground region may be formed that is electrically connected to a ground region (320) of the printed circuit board (300) at the first ground portion (150) and the second ground portion (250) or at the first edge region (170) and the second edge region (270). The outer surface of the first body (100) and the outer surface of the second body (200) may be coated, such as by anodizing, except for the underside of the first ground portion (150) and the upper surface of the second ground portion (250). Thus, the metal region in the first body (100) and the metal region in the second body (200) may be exposed to the outside through the underside of the first ground portion (150) and the top surface of the second ground portion (250), respectively, and may be electrically connected to each other by contact of the first ground portion (150) and the second ground portion (250).

According to the above structure, the first body, the second body, and the printed circuit board are electrically connected to form a ground region, so that electromagnetic waves generated in the circuit region of the printed circuit board can be radiated outward to affect adjacent electronic components, or electromagnetic waves generated from the outside can be inhibited from entering the printed circuit board, thereby further improving the electrical characteristics of the camera module, and inhibiting the inclusion of noise in the electrical signals, thereby obtaining a superior quality image.

In addition, the contact of the first ground portion and the second ground portion forms a region where the adhesive member is disposed between the first body and the second body, which has the advantage of facilitating the manufacturing process of the camera module.

While embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects.

The invention claimed is:

1. A camera module comprising:
a first body including a lens;
a second body coupled to the first body; and
a printed circuit board arranged in the first body, wherein the first body includes a first ground portion protruding downward,
wherein the second body includes a second ground portion protruding upward to contact the first ground portion,
wherein the printed circuit board includes a circuit region, and a ground region disposed along an edge of the circuit region, and
wherein the ground region includes a guide groove through which the first ground portion passes.

2. The camera module of claim 1, wherein the first body includes a top plate and a first side plate extending downwardly from the top plate, the first ground portion projects downwardly from a bottom surface of the top plate, and the second body includes a bottom plate and a second side plate extending upwardly from the bottom plate, and the second ground portion projects upwardly from a top surface of the bottom plate.

3. The camera module of claim 1, wherein a first edge region is disposed on a bottom surface of the first body and a second edge region is disposed on a top surface of the second body, and when the first ground portion and the second ground portion are in contact, the first edge region and the second edge region are at least partially spaced apart in an optical axis direction.

4. The camera module of claim 3, wherein an adhesive member is disposed between the first edge region and the second edge region.

5. The camera module of claim 4, wherein the adhesive member includes an epoxy.

6. The camera module of claim 3, wherein the first edge region includes a first protrusion and a first groove disposed inwardly of the first protrusion, and the second edge region includes a second groove into which the first protrusion is engaged and a second protrusion engaged in the first groove, wherein a bottom end of the first protrusion is disposed lower than a top end of the second protrusion.

7. The camera module of claim 6, wherein a bottom end of the first ground portion is disposed lower than a bottom end of the first protrusion, and a top end of the second ground portion is disposed lower than a bottom surface of the second groove.

8. The camera module of claim 7, wherein the first ground portion includes a first-1 ground portion disposed at a corner of the first body and a first-2 ground portion disposed at a side of the first body, and the second ground portion includes a second-1 ground portion disposed at a corner of the second body and in contact with the first ground portion, and a second-2 ground portion disposed at a side of the second body and in contact with the first-1 ground portion.

9. The camera module of claim 7, wherein a lower surface of the first protrusion is spaced apart from a bottom surface of the second groove.

10. The camera module of claim 7, wherein a lower surface of the first protrusion is in contact with a bottom surface of the second groove.

11. The camera module of claim 6, wherein a first inclined surface is formed on a lower surface of the first protrusion, and
wherein a second inclined surface corresponding to the first inclined surface is formed on an upper surface of the second protrusion.

12. The camera module of claim 1, wherein a first screw hole is disposed in the ground region,
wherein the first body includes a second screw hole facing the first screw hole, and
wherein the printed circuit board is screwed to the first body by screws coupled to the first screw hole and the second screw hole.

13. The camera module of claim 12, wherein the first body includes a second coupling portion in which the second screw hole is formed on a lower surface, and
- wherein a lower end of the second coupling portion is disposed higher than a lower end of the first ground portion.

14. The camera module of claim 1, wherein the first body and the second body are made of metal.

15. The camera module of claim 1, wherein an embossed portion is disposed on a lower surface of the first ground portion or an upper surface of the second ground portion.

16. A camera module, comprising:
- a first body including a lens, and including a first edge region on a bottom surface;
- a second body coupled to the first body, and including a second edge region on a top surface facing the first edge region; and
- a printed circuit board disposed within the first body,
- wherein the first body includes a first ground portion projecting downwardly,
- wherein the second body includes a second ground portion projecting upwardly and in contact with the first ground portion,
- wherein when the first ground portion and the second ground portion contact each other, at least a portion of the first edge region and the second edge region are spaced apart in an optical axis direction.

17. The camera module of claim 16, wherein the printed circuit board includes a circuit region and a ground region disposed along an edge of the circuit region, and
- wherein the ground region includes a guide groove through which the first ground portion passes.

18. The camera module of claim 17, wherein a first screw hole is disposed in the ground region,
- wherein the first body includes a second screw hole facing the first screw hole, and
- wherein the printed circuit board is screwed to the first body by screws coupled to the first screw hole and the second screw hole.

19. The camera module of claim 16, wherein the first body includes a top plate and a first side plate extending downwardly from the top plate, the first ground portion projects downwardly from a bottom surface of the top plate, and the second body includes a bottom plate and a second side plate extending upwardly from the bottom plate, and the second ground portion projects upwardly from a top surface of the bottom plate.

20. The camera module of claim 16, wherein an adhesive member is disposed between the first edge region and the second edge region.

* * * * *